US012664074B2

(12) United States Patent (10) Patent No.: US 12,664,074 B2

Kruempelmann et al. (45) Date of Patent: Jun. 23, 2026

(54) DEPLOYMENT OF UPDATES TO CONFIGURATION TEMPLATES CORRELATED TO SOFTWARE UPGRADES

(71) Applicant: SAP SE, Walldorf (DE)

(72) Inventors: Wulf Kruempelmann, Altlussheim (DE); Susanne Schott, Walldorf (DE); Axel Kuehl, Mannheim (DE)

(73) Assignee: SAP SE, Walldorf (DE)

( * ) Notice: Subject to any disclaimer, the term of this patent is extended or adjusted under 35 U.S.C. 154(b) by 318 days.

(21) Appl. No.: 18/469,311

(22) Filed: Sep. 18, 2023

(65) Prior Publication Data

US 2025/0094323 A1 Mar. 20, 2025

(51) Int. Cl.
 *G06F 11/36* (2025.01)
 *G06F 8/65* (2018.01)
 *G06F 11/3668* (2025.01)

(52) U.S. Cl.
 CPC ............. *G06F 11/3684* (2013.01); *G06F 8/65* (2013.01); *G06F 11/3688* (2013.01)

(58) Field of Classification Search
 CPC ............. G06F 11/3684; G06F 11/3688; G06F 11/3698; G06F 8/65; G06F 8/71
 See application file for complete search history.

(56) References Cited

U.S. PATENT DOCUMENTS

| | | | | |
|---|---|---|---|---|
| 2011/0258612 | A1* | 10/2011 | Matthiesen | ......... G06F 11/3698 |
| | | | | 717/135 |
| 2016/0335068 | A1* | 11/2016 | Wieczorek | .......... G06F 11/3688 |
| 2017/0168919 | A1* | 6/2017 | Eberlein | ............. G06F 11/3698 |
| 2018/0095743 | A1* | 4/2018 | Specht | ....................... G06F 8/71 |
| 2018/0107585 | A1* | 4/2018 | Ramesh | ................... G06F 8/443 |
| 2020/0034342 | A1* | 1/2020 | Mohapatra | .............. G06F 16/21 |
| 2020/0301585 | A1* | 9/2020 | Mizuno | ................. G06F 3/0673 |
| 2021/0173626 | A1* | 6/2021 | Kruempelmann | ....... G06F 16/16 |
| 2025/0036489 | A1* | 1/2025 | Griffin | ....................... G06F 8/71 |

FOREIGN PATENT DOCUMENTS

| | | | | |
|---|---|---|---|---|
| CN | 111813439 A | * 10/2020 | ............... | G06F 8/71 |

OTHER PUBLICATIONS

Ding et al. CN-111813439-A with English Translation (Year: 2020).*

* cited by examiner

*Primary Examiner* — S. Sough
*Assistant Examiner* — Mohammad H Kabir
(74) *Attorney, Agent, or Firm* — Mintz Levin Cohn Ferris Glovsky and Popeo, P.C.

(57) ABSTRACT

Arrangements for deployment of updates to configuration templates correlated to software upgrades are provided. In some aspects, a content configuration upgrade may be initiated within a system landscape including a development system, a test system, and a production system. A transport request including content configuration upgrade data may be received, in an inactive state, at the development system. The content configuration upgrade data may be released to the test system via the transport request. The test system may be restricted from user interaction. The test system may be set to enable customizing using the test system. The content configuration upgrade data may be activated in the test system. In addition, the activating may cause configuration changes to be added one or more database tables and a new transport request to be generated. The test system may be restored for user interaction with upgraded content configuration data.

20 Claims, 5 Drawing Sheets

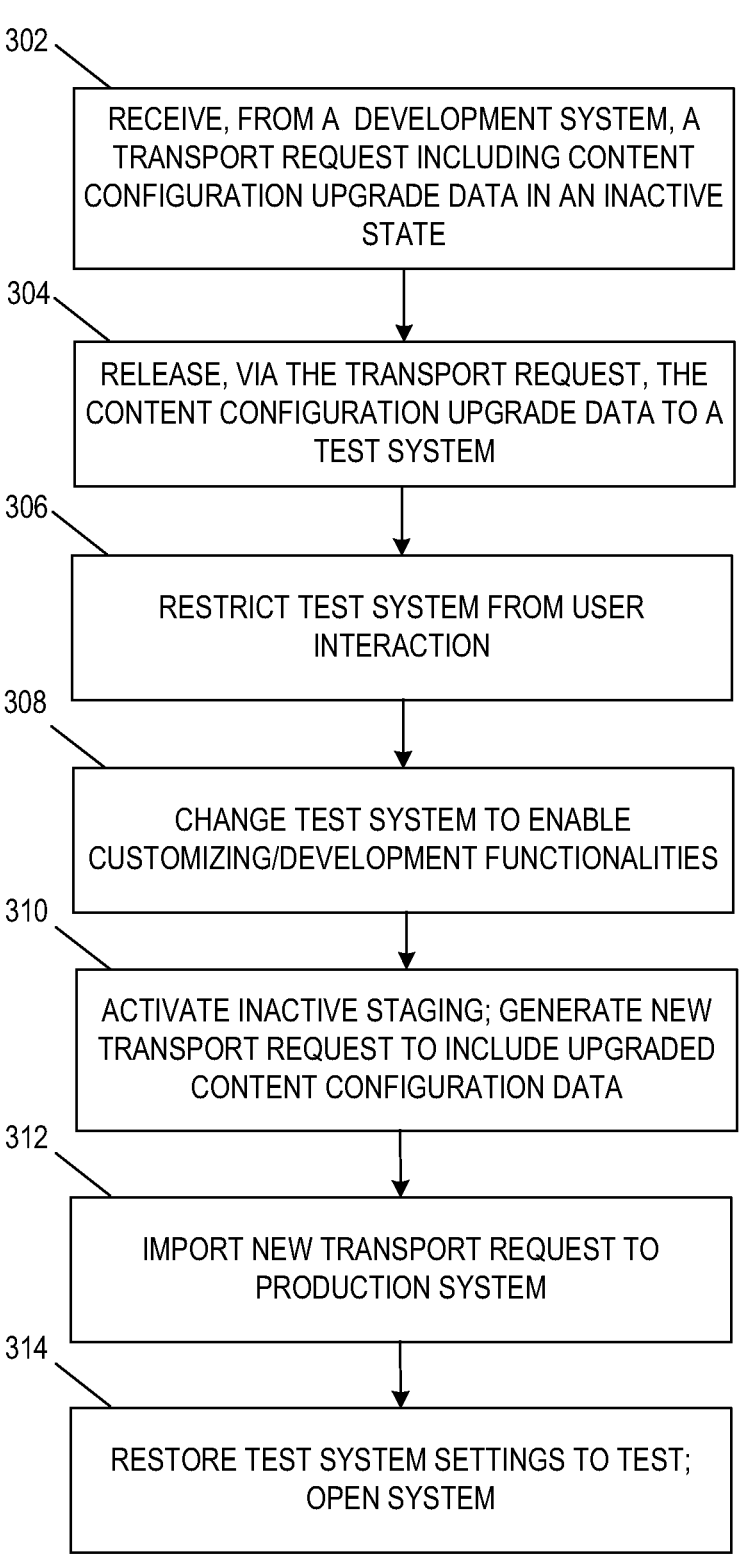

302

RECEIVE, FROM A DEVELOPMENT SYSTEM, A TRANSPORT REQUEST INCLUDING CONTENT CONFIGURATION UPGRADE DATA IN AN INACTIVE STATE

304

RELEASE, VIA THE TRANSPORT REQUEST, THE CONTENT CONFIGURATION UPGRADE DATA TO A TEST SYSTEM

306

RESTRICT TEST SYSTEM FROM USER INTERACTION

308

CHANGE TEST SYSTEM TO ENABLE CUSTOMIZING/DEVELOPMENT FUNCTIONALITIES

310

ACTIVATE INACTIVE STAGING; GENERATE NEW TRANSPORT REQUEST TO INCLUDE UPGRADED CONTENT CONFIGURATION DATA

312

IMPORT NEW TRANSPORT REQUEST TO PRODUCTION SYSTEM

314

RESTORE TEST SYSTEM SETTINGS TO TEST; OPEN SYSTEM

FIG. 3

DEPLOYMENT OF UPDATES TO CONFIGURATION TEMPLATES CORRELATED TO SOFTWARE UPGRADES

TECHNICAL FIELD

The subject matter described herein relates generally to cloud computing and more specifically to deployment of updates to configuration templates correlated to software upgrades.

BACKGROUND

During development of new software, corresponding tables with configuration data might be changed. Since the configuration data in cloud systems is often provided by templates, these templates must then be modified and deployed again. In a three-system landscape, the deployment must be done independently from the normal customizing development, but the deployment mechanism is only connected to the development system. In addition, dependencies may exist between configuration data. In such instances, users may be forced to transport untested configuration data to a production environment. It may be difficult to implement released fixes needed to the production environment in an efficient manner.

SUMMARY

Aspects of the disclosure provide effective, efficient, scalable, and convenient technical solutions that address and overcome the technical problems associated with the deployment of updates to configuration templates correlated to software upgrades.

Methods, systems, and articles of manufacture, including computer program products, are provided for deployment of updates to configuration templates correlated to software upgrades. In one aspect, there is provided a system including at least one processor and at least one memory. The at least one memory can store instructions that cause operations when executed by the at least one processor. The operations may include: receiving, at a development system within a system landscape comprising the development system, a test system, and a production system, a transport request including the content configuration upgrade data in an inactive state; releasing, via the transport request, the content configuration upgrade data to the test system; restricting the test system from user interaction; setting the test system to enable customizing using the test system; activating the content configuration upgrade data in the test system, wherein the activating adds configuration changes to one or more database tables and generates a new transport request including upgraded content configuration data; and restoring the test system for user interaction with the upgraded content configuration data.

In some variations, one or more of the features disclosed herein including the following features can optionally be included in any feasible combination. In some variations, the operations may further include releasing the new transport request to a buffer of the production system, and importing the new transport request to the production system.

In some variations, the inactive state may be indicated by a flag.

In some variations, setting the test system to enable customizing using the test system may include setting a flag to enable development functionalities.

In some variations, the content configuration upgrade data may be identified by a JavaScript Object Notation (JSON) file. In some examples, the JSON file may indicate transport into the test system or into the production system.

In some variations, receiving the content configuration upgrade data from the development system may include receiving a delta for a content configuration upgrade.

In some variations, the system landscape may include a cloud-computing platform.

In another aspect, there is provided a method for deployment of updates to configuration templates correlated to software upgrades. The method may include: receiving, at a development system within a system landscape comprising the development system, a test system, and a production system, a transport request including content configuration upgrade data in an inactive state; releasing, via the transport request, the content configuration upgrade data to the test system; restricting the test system from user interaction; setting the test system to enable customizing using the test system; activating the content configuration upgrade data in the test system, wherein the activating adds configuration changes to one or more database tables and generates a new transport request including upgraded content configuration data; and restoring the test system for user interaction with the upgraded content configuration data.

In some variations, one or more of the features disclosed herein including the following features can optionally be included in any feasible combination. The method may further include releasing the new transport request to a buffer of the production system, and importing the new transport request to the production system.

In some variations, the inactive state is indicated by a flag.

In some variations, setting the test system to enable customizing using the test system comprises setting a flag to enable development functionalities.

In some variations, the content configuration upgrade data is identified by a JavaScript Object Notation (JSON) file. In some examples, the JSON file indicates transport into the test system or into the production system.

In some variations, receiving the content configuration upgrade data from the development system comprises receiving a delta for a content configuration upgrade.

In some variations, the system landscape comprises a cloud computing platform.

In another aspect, there is provided a computer program product that includes a non-transitory computer readable medium. The non-transitory computer readable medium may store instructions that cause operations when executed by at least one data processor. The operations may include: receiving, at a development system within a system landscape comprising the development system, a test system, and a production system, a transport request including content configuration upgrade data in an inactive state; releasing, via the transport request, the content configuration upgrade data to the test system; restricting the test system from user interaction; setting the test system to enable customizing using the test system; activating the content configuration upgrade data in the test system, wherein the activating adds configuration changes to one or more database tables and generates a new transport request including upgraded content configuration data; and restoring the test system for user interaction with the upgraded content configuration data.

In some variations, one or more of the features disclosed herein including the following features can optionally be included in any feasible combination. In some variations, the operations may further include releasing the new transport request to a buffer of the production system, and importing the new transport request to the production system.

In some variations, the inactive state is indicated by a flag.

In some variations, setting the test system to enable customizing using the test system comprises setting a flag to enable development functionalities.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to centralizing the configuration of enterprise software applications, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 depicts a flowchart illustrating a process for implementing deployment of updates to configuration templates correlated to software upgrades, in accordance with some example embodiments.

Figure 1:
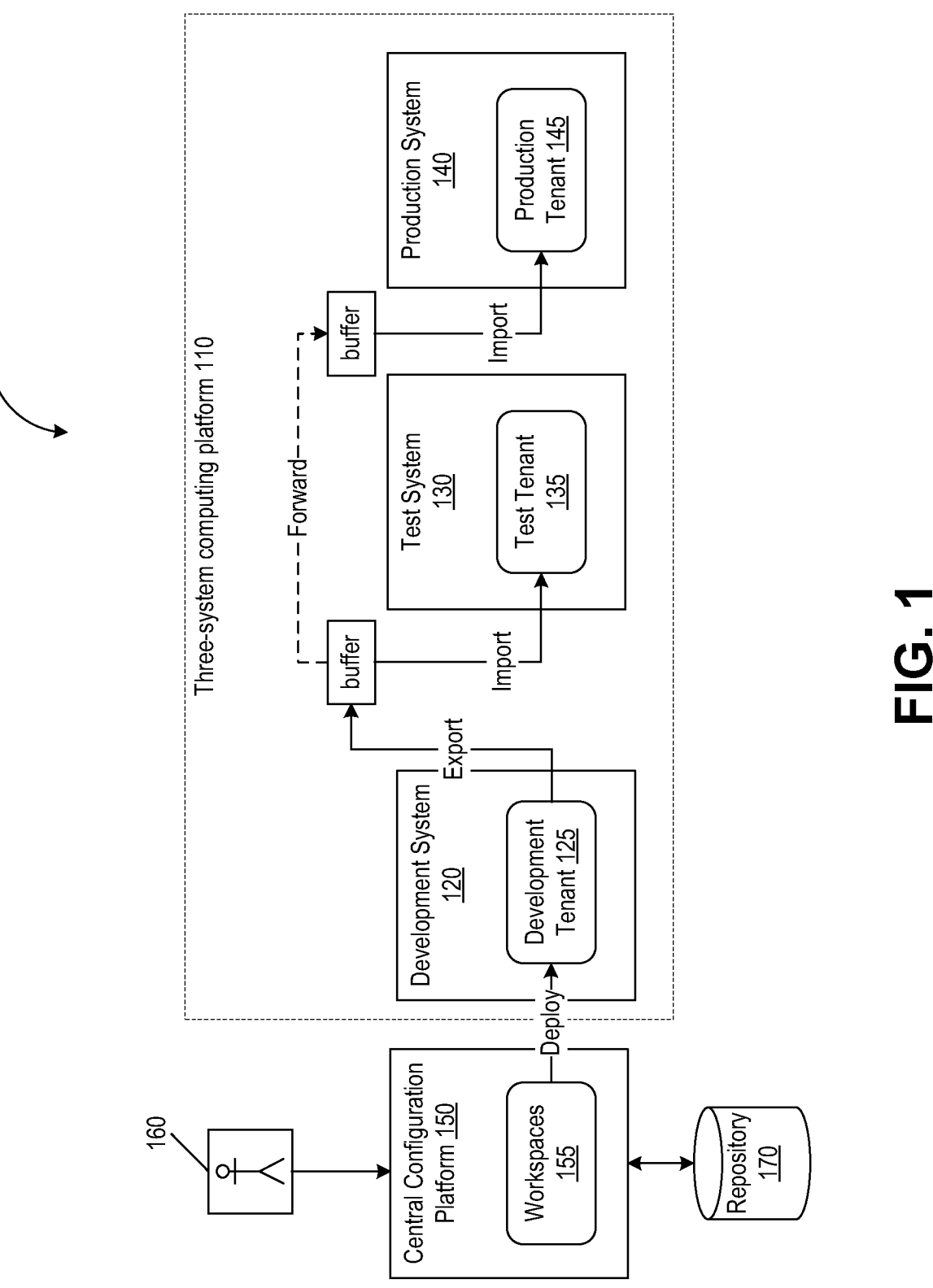
FIG. 1 depicts an illustrative computing environment for deployment of updates to configuration templates correlated to software upgrades, in accordance with some example embodiments.

When practical, like labels are used to refer to same or similar items in the drawings.

DETAILED DESCRIPTION

As a brief introduction to the concepts described further herein, one or more aspects of the disclosure relate to implementing deployment of updates to configuration templates correlated to software upgrades. Conventionally, each and every transport coming from central configuration platform would go through a sequence from central configuration platform to a development system 120, and then to a test system, where custom developments and configurations may be tested before being forwarded to the production system. The problem with this sequence is that oftentimes, there may be dependencies between parts of configurations. Despite the presence of these dependencies, a user may be forced to release all of the transports, even if they are untested, to the production environment. Otherwise, due to these dependencies, the custom developments and configurations might be stuck in development, which is undesirable. Instead, a user might wish to separate changes such that some changes that might be urgently needed, or some smaller changes (e.g., changing an address), are able to go faster to production and are separated from those changes that might take longer (e.g., adding new country information). Advantageously, the present disclosure allows users to implement released fixes needed to the production environment more quickly and efficiently, while not being forced to also transport untested data. In particular, one or more aspects of the disclosure may provide a method for inactive deployment of configuration templates to a development environment and use a test environment to activate the data for productive use. These and various other arrangements will be discussed more fully below.

FIG. 1 depicts an illustrative computing environment 100 (e.g., three-system landscape) for deployment of updates to configuration templates correlated to software upgrades, in accordance with some example embodiments. Referring to FIG. 1, the computing environment 100 may include a central configuration platform 150, a three-system configuration platform/landscape consisting of: a development system 120, a test (or quality assurance) system 130, and a production system 140, and a repository 170. The central configuration platform 150, development system 120, test system 130, and production system 140 may be communicatively coupled via a network. The network may be a wired and/or wireless network including, for example, a wide area network (WAN), local area network (LAN), a virtual local area network (VLAN), the Internet, and/or the like. Moreover, the development system 120, the test system 130, and the production system 140 may be hosted on a cloud computing platform.

Configuration content in the three-system landscape may be provided via the central configuration platform 150, which is connected to the development system 120.

The development system 120 provides a safe environment for the development of projects. Once development and configuration projects are finalized in the development system 120, they may be transported to the test system 130. In the test system 130, custom developments and configurations may be tested before being forwarded to the production system 140.

Central configuration platform 150 may include one or more workspaces 155 for managing configurations. The three-system landscape consists of the following systems and tenants: the development system 120 may include a development tenant 125 for developer extensibility (e.g., building custom developments), the test system 130 may include a test tenant 135 for simulating an environment that is enabled for testing during software development, and the production system 140 may include production tenant 145 used to process live data for production use.

Repository/database system 170 may include different information storage entities storing configuration content information. In some examples, repository/database system 170 may store configuration content data, including updates and upgrades to the configuration content, which may be read by central configuration platform 150.

Figure 2A:
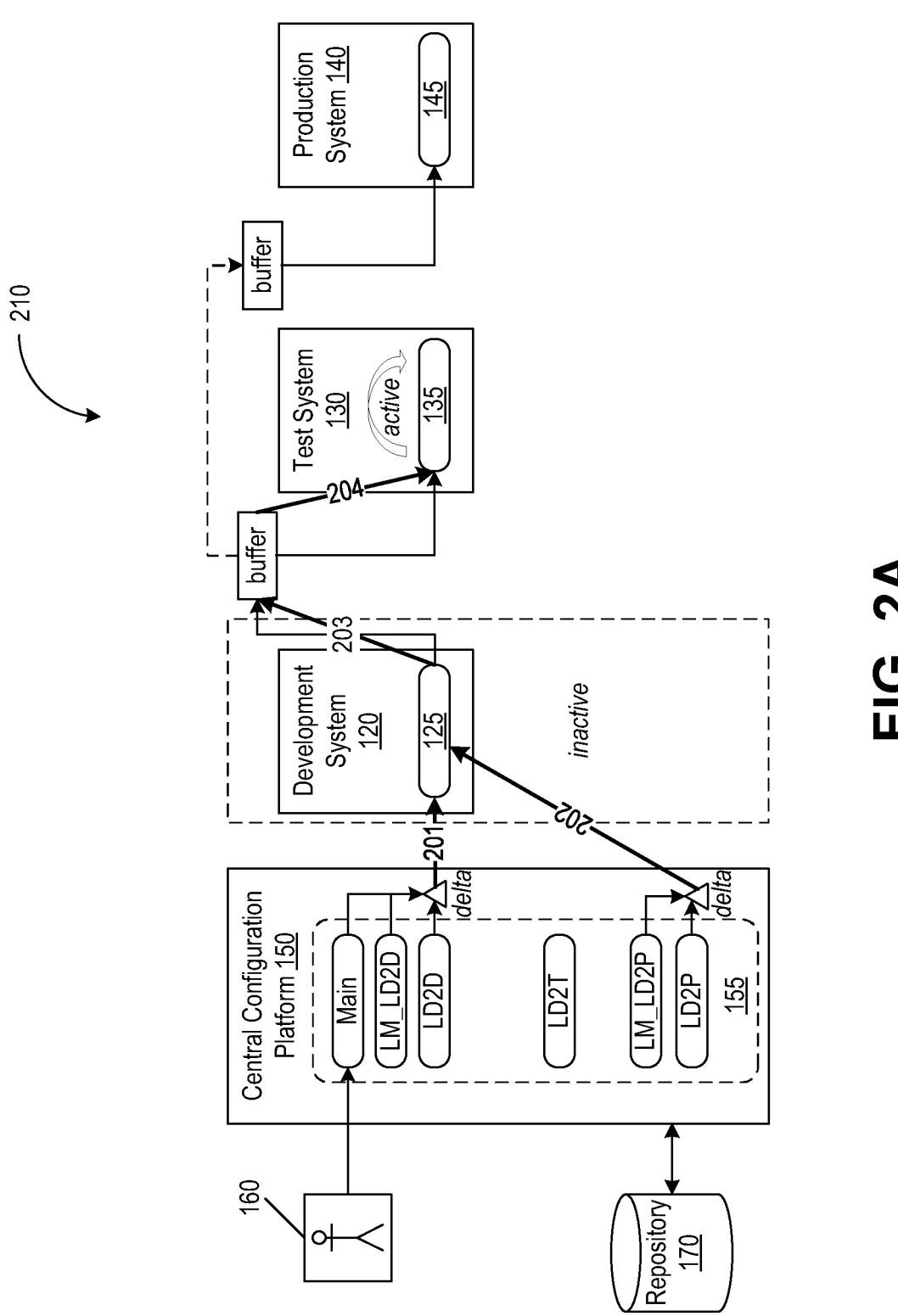
FIG. 2A depicts an illustrative system for deployment of updates to configuration templates correlated to software upgrades, in accordance with some example embodiments.
Figure 2B:
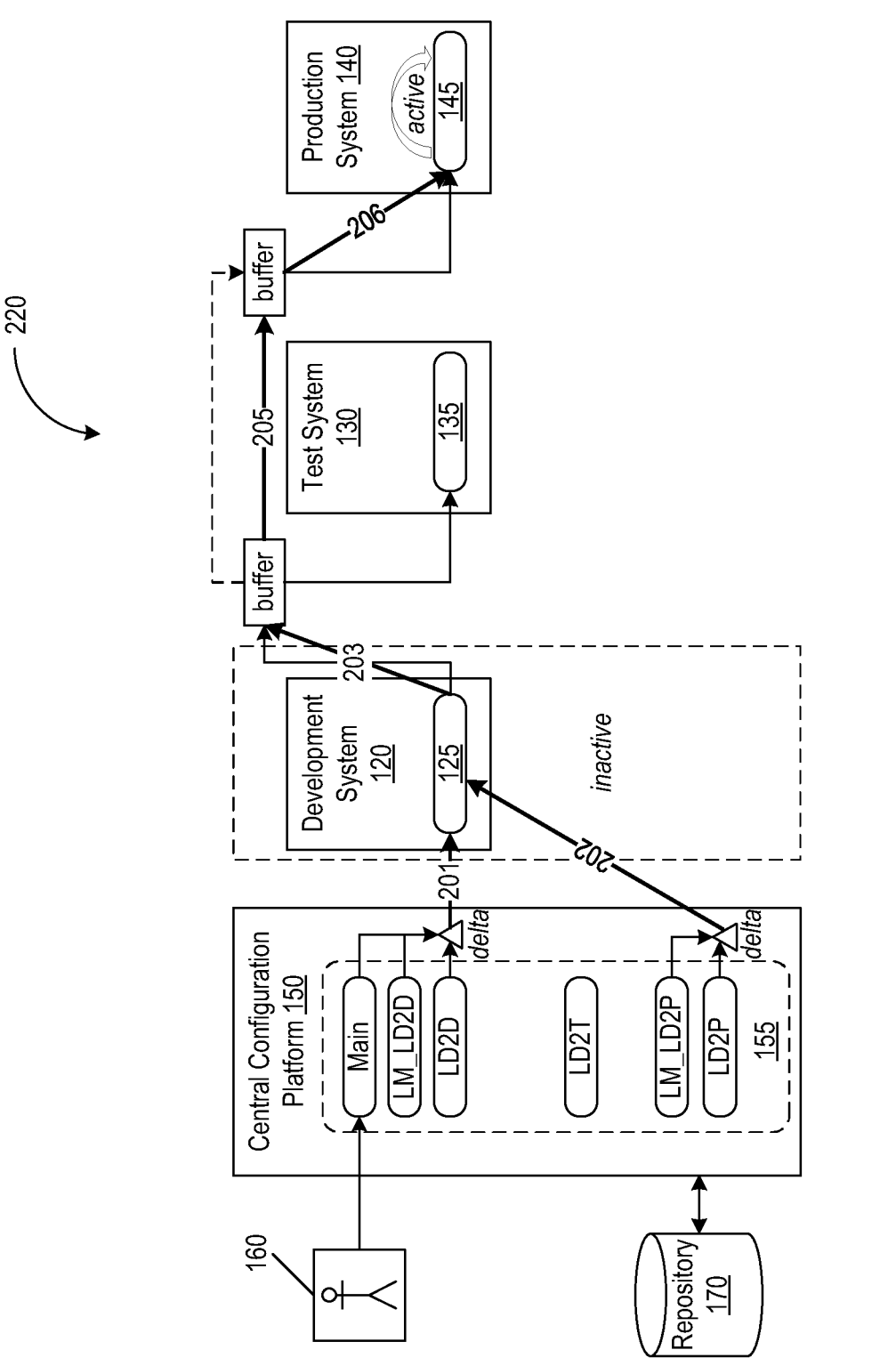
FIG. 2B depicts an illustrative system for deployment of updates to configuration templates correlated to software upgrades, in accordance with some example embodiments.

To further illustrate, FIGS. 2A and 2B depict illustrative systems 210, 220 for deployment of updates to configuration templates correlated to software upgrades. During an upgrade to a business process, software and/or corresponding configuration data may change. However, there is no direct connection between the central configuration platform 150 and the test or production system 130, 140. Therefore, aspects of the disclosure provide an indirect transport of the configuration data, discussed more fully below.

Referring to FIG. 2A, an after-import method is used in connection with the transport of an object into a different system. The after-import method is called in the target system after the object has been imported. In some examples, the after-import method is used to activate the imported object, in order to integrate it in a new context in the target system. An after import method may be and/or include a method (e.g., an executable program) configured to modify one or more databases so that the database(s) are compatible with, for example, a system upgrade.

In one non-limiting example shown in FIG. 2A, a JSON file may be shipped, at 201 and/or 202, to the development system 120 with an inactive flag (e.g., inactive configuration). An after-import method may check if the JSON file is for the test system 130 or for the production system 140. After-import methods may be used for post-processing activities after importing customizing objects such as generating objects based on new or changed settings or to execute consistency checks. If the JSON file is for the test system 130, then it is activated in the test system 130 (e.g., following the path from 203 to 204). For instance, data (e.g., information on configuration changes) is extracted from the JSON file and deployed to the target system. Accordingly, the test system 130 may be blocked for users (e.g., user 160) such that the system cannot be used during the activation of configuration data. Since the activation method only works in development systems, the status of the test system 130 is changed temporarily to "development" (e.g., change a flag to indicate "development" status). The activation process puts the inactive configuration data directly to database tables (e.g., repository 170) and makes them active. The test system settings are restored to "test," and users (e.g. user 160) may then work directly on the test system with the new configurations.

Similarly, referring to FIG. 2B, if the JSON file is for the production system 140, then it is activated in the production system 140 (e.g., following the path from 203 to 205 to 206). Accordingly, the production system 140 may be blocked for users (e.g., user 160) such that the system cannot be used during the activation of configuration data. Since the activation method only works in development systems, the status of the production system 140 is changed temporarily to "development." The activation process puts the inactive configuration data directly to database tables (e.g., repository 170) and makes them active. The production system settings are restored to "production," and the system is opened to users (e.g., user 160) with the new configurations.

FIG. 3 depicts a flowchart illustrating a process 300 for implementing updates to configuration templates correlated to software upgrades, in accordance with some example embodiments. Referring to FIGS. 1, 2A-2B, and 3, the process 300 may be performed using a three-system computing platform 110 that includes development system 120, test system 130, and production system 140 in order to implement updates to configuration templates correlated to software upgrades.

At 302, the computing platform 110 may receive, at the development system 120, a transport request including content configuration upgrade data. The content configuration upgrade data may be identified by a JavaScript Object Notation (JSON) file. In addition, the JSON file may indicate transport into the test system 130 or into the production system 140. Transport requests (e.g., a change request) may include a container or package of changes that are made in the development system (e.g., used to transfer data from one installation to another). Transport requests may record information regarding the type of change, the purpose of transport, request category, and target system. Each transport request may include one or more change jobs (e.g., tasks, or minimum unit of transportable change). Tasks may be stored inside a transport request. Typically, the transport request is released only once all the tasks inside the transport request are completed, released, or deleted.

In some examples, during upgrade of the development system 120, an external system (e.g., central configuration platform 150) may calculate the configuration templates (e.g., business configuration templates), calculate a delta (e.g., difference) for the content configuration upgrade in the test/productive system 130, 140, as well as the delta for the development system 120. In some examples, it may be assumed that the configurations between the test system 130 and the productive system 140 is identical or differs only in the content of known transport requests of data.

In some examples, the external system (e.g., central configuration platform 150) calculates the delta (based on the configuration of the test system 130) via the information of transports requests, which is synchronized from the development system 120 to the central configuration platform 150. The external system (e.g., central configuration platform 150) may calculate the delta configuration both for the development system 120 with the current configuration data as well as the delta for the test system 130, based on released transport requests.

The configuration for the development system 120 may be deployed as normal configuration, and the configuration may be deployed inactive as an inactive configuration. This inactive staging is written as the inactive object or a flag to a transport request. As this request only contains inactive information, it can be released without any harm to the test system 130 and imported there.

At step 304, the computing platform 110 may release, via the transport request, the content configuration upgrade data to the test system 130. Transport requests may range from small changes to major changes. Each transport request includes one or more change jobs, also known as change tasks.

At step 306, the computing platform 110 may restrict or lock the test system 120 from user interaction (e.g., user requests). For example, the computing platform 110 may block the system for users such that the system cannot be used during the activation of configuration upgrades.

At step 308, the computing platform 110 may set the test system 130 to enable customizing using the test system 130. For example, since an activation method for activating the configuration data would only work in a development environment, the computing platform 110 may change the test system to act as a temporary development environment.

At step 310, the computing platform 110 may activate the content configuration upgrade data in the test system 120 (e.g., automatically activate the inactive data). In some examples, the process of activating the content configuration upgrade data adds configuration changes to one or more database tables and generates a new transport request including upgraded content configuration data (e.g., a transport request with the changes).

At step 312, the computing platform 110 may release the new transport request to a transport buffer of the production system. During a next transport import into the productive system, the delta transport may be automatically imported.

At step 314, the computing platform 110 may restore the test system for user interaction. For example, the computing platform 110 may restore the test system settings to a test environment for normal use. For example, users may directly work on the test system 130 with the new configuration data.

Figure 4:
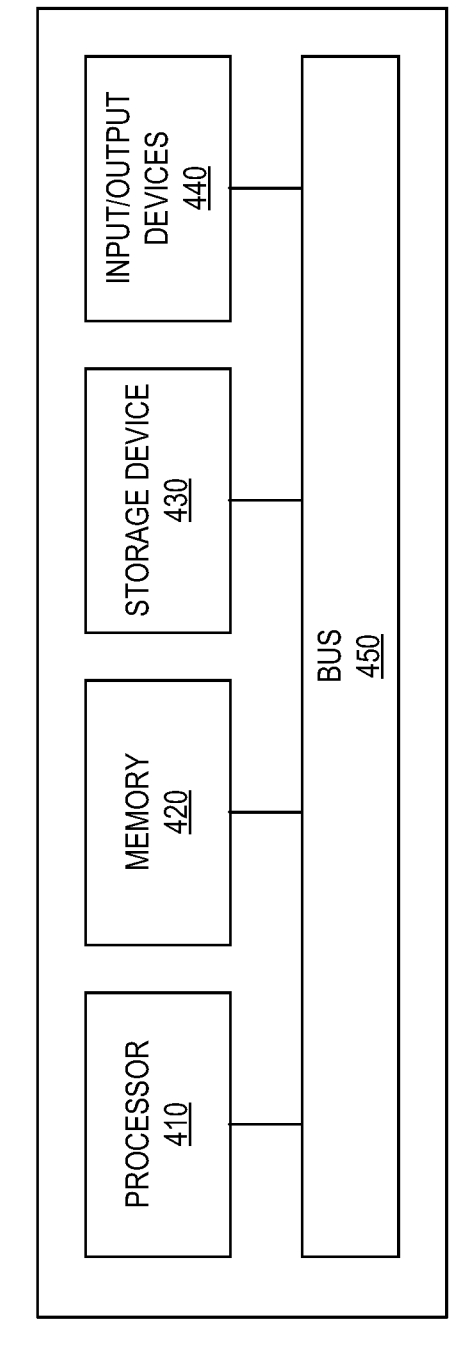
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1, 2A-B, and 3, the computing system 400 can be used to implement the computing platform 110 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the computing platform 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:

at least one data processor; and at least one memory storing instructions, which when executed by the at least one data processor, result in operations comprising:

receiving, at a development system within a system landscape comprising the development system, a test system, and a production system, a transport request including content configuration upgrade data in an inactive state;

releasing, via the transport request, the content configuration upgrade data to the test system;

restricting the test system from user interaction;

setting the test system to enable customizing using the test system;

activating the content configuration upgrade data in the test system, wherein the activating adds configuration changes to one or more database tables and generates a new transport request including upgraded content configuration data; and restoring the test system for user interaction with the upgraded content configuration data.

Example 2: The system of Example 1, further comprising:

releasing the new transport request to a buffer of the production system; and importing the new transport request to the production system.

Example 3: The system of any of Examples 1-2, wherein the inactive state is indicated by a flag.

Example 4: The system of any of Examples 1-3, wherein setting the test system to enable customizing using the test system comprises setting a flag to enable development functionalities.

Example 5: The system of any of Examples 1-4, wherein the content configuration upgrade data is identified by a JavaScript Object Notation (JSON) file.

Example 6: The system of any of Examples 1-5, wherein the JSON file indicates transport into the test system or into the production system.

Example 7: The system of any of Examples 1-6, wherein receiving the content configuration upgrade data from the development system comprises receiving a delta for a content configuration upgrade.

Example 8: The system of any of Examples 1-7, wherein the system landscape comprises a cloud computing platform.

Example 9: A computer-implemented method comprising:

receiving, at a development system within a system landscape comprising the development system, a test system, and a production system, a transport request including content configuration upgrade data in an inactive state;

releasing, via the transport request, the content configuration upgrade data to the test system;

restricting the test system from user interaction;

setting the test system to enable customizing using the test system;

activating the content configuration upgrade data in the test system, wherein the activating adds configuration changes to one or more database tables and generates a new transport request including upgraded content configuration data; and restoring the test system for user interaction with the upgraded content configuration data.

Example 10: The method of Example 9, further comprising:

releasing the new transport request to a buffer of the production system; and importing the new transport request to the production system.

Example 11: The method of any of Examples 9-10, wherein the inactive state is indicated by a flag.

Example 12: The method of any of Examples 9-11, wherein setting the test system to enable customizing using the test system comprises setting a flag to enable development functionalities.

Example 13: The method of any of Examples 9-12, wherein the content configuration upgrade data is identified by a JavaScript Object Notation (JSON) file.

Example 14: The method of any of Examples 9-13, wherein the JSON file indicates transport into the test system or into the production system.

Example 15: The method of any of Examples 9-14, wherein receiving the content configuration upgrade data from the development system comprises receiving a delta for a content configuration upgrade.

Example 16: The method of any of Examples 9-15, wherein the system landscape comprises a cloud computing platform.

Example 17: A non-transitory computer readable medium storing instructions, which when executed by at least one data processor, result in operations comprising:

receiving, at a development system within a system landscape comprising the development system, a test system, and a production system, a transport request including content configuration upgrade data in an inactive state;

releasing, via the transport request, the content configuration upgrade data to the test system;

restricting the test system from user interaction;

setting the test system to enable customizing using the test system;

activating the content configuration upgrade data in the test system, wherein the activating adds configuration changes to one or more database tables and generates a new transport request including upgraded content configuration data; and restoring the test system for user interaction with the upgraded content configuration data.

Example 18: The non-transitory computer readable medium of Example 17, wherein the instructions, when executed by the at least one data processor, further result in operations comprising:

releasing the new transport request to a buffer of the production system; and importing the new transport request to the production system.

Example 19: The non-transitory computer readable medium of any of Examples 17-18, wherein the inactive state is indicated by a flag.

Example 20: The non-transitory computer readable medium of any of Examples 17-19, wherein setting the test system to enable customizing using the test system comprises setting a flag to enable development functionalities.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:

at least one data processor; and at least one memory storing instructions, which when executed by the at least one data processor, result in operations comprising:

receiving, at a development system within a system landscape comprising the development system, a test system, and a production system, a file indicating a transport request including content configuration upgrade data in an inactive state;

extracting an indication from the file that the content configuration upgrade data is intended for transport into either the test system or the production system;

responsive to the content configuration upgrade data being intended for transport into the test system, releasing, via the transport request, the content configuration upgrade data to the test system;

restricting the test system from user interaction;

setting the test system to enable customizing using the test system;

activating the content configuration upgrade data in the test system, wherein the activating adds configuration changes to one or more database tables and generates a new transport request including upgraded content configuration data; and restoring the test system for the user interaction with the upgraded content configuration data.

2. The system of claim 1, further comprising:

releasing the new transport request to a buffer of the production system; and importing the new transport request to the production system.

3. The system of claim 1, wherein the inactive state is indicated by a flag.

4. The system of claim 1, wherein setting the test system to enable customizing using the test system comprises setting a flag to enable development functionalities.

5. The system of claim 1, wherein the file is a JavaScript Object Notation (JSON) file that is shipped to the development system from a central configuration platform that is external to the system landscape.

6. The system of claim 5, wherein the JSON file indicates transport into the test system or into the production system.

7. The system of claim 1, wherein receiving the content configuration upgrade data from the development system comprises receiving a delta for a content configuration upgrade.

8. The system of claim 1, wherein the system landscape comprises a cloud computing platform.

9. A computer-implemented method comprising:

receiving, at a development system within a system landscape comprising the development system, a test system, and a production system, a file indicating a transport request including content configuration upgrade data in an inactive state;

extracting an indication from the file that the content configuration upgrade data is intended for transport into either the test system or the production system;

responsive to the content configuration upgrade data being intended for transport into the test system, releasing, via the transport request, the content configuration upgrade data to the test system;

restricting the test system from user interaction;

setting the test system to enable customizing using the test system;

activating the content configuration upgrade data in the test system, wherein the activating adds configuration changes to one or more database tables and generates a new transport request including upgraded content configuration data; and restoring the test system for the user interaction with the upgraded content configuration data.

10. The method of claim 9, further comprising:

releasing the new transport request to a buffer of the production system; and importing the new transport request to the production system.

11. The method of claim 9, wherein the inactive state is indicated by a flag.

12. The method of claim 9, wherein setting the test system to enable customizing using the test system comprises setting a flag to enable development functionalities.

13. The method of claim 9, wherein the file is a JavaScript Object Notation (JSON) file that is shipped to the development system from a central configuration platform that is external to the system landscape.

14. The method of claim 13, wherein the JSON file indicates transport into the test system or into the production system.

15. The method of claim 9, wherein receiving the content configuration upgrade data from the development system comprises receiving a delta for a content configuration upgrade.

16. The method of claim 9, wherein the system landscape comprises a cloud computing platform.

17. A non-transitory computer readable medium storing instructions, which when executed by at least one data processor, result in operations comprising:

receiving, at a development system within a system landscape comprising the development system, a test system, and a production system, a file indicating a transport request including content configuration upgrade data in an inactive state;

extracting an indication from the file that the content configuration upgrade data is intended for transport into either the test system or the production system;

responsive to the content configuration upgrade data being intended for transport into the test system, releasing, via the transport request, the content configuration upgrade data to the test system;

restricting the test system from user interaction;

setting the test system to enable customizing using the test system;

activating the content configuration upgrade data in the test system, wherein the activating adds configuration changes to one or more database tables and generates a new transport request including upgraded content configuration data; and restoring the test system for the user interaction with the upgraded content configuration data.

18. The non-transitory computer readable medium of claim 17, wherein the instructions, when executed by the at least one data processor, further result in operations comprising:

releasing the new transport request to a buffer of the production system; and importing the new transport request to the production system.

19. The non-transitory computer readable medium of claim 17, wherein the inactive state is indicated by a flag.

20. The non-transitory computer readable medium of claim 17, wherein setting the test system to enable customizing using the test system comprises setting a flag to enable development functionalities.

\* \* \* \* \*